(12) United States Patent
Naruse et al.

(10) Patent No.: US 7,951,968 B2
(45) Date of Patent: May 31, 2011

(54) METAL-CONTAINING COMPOUND AND USE THEREOF

(75) Inventors: Hiroshi Naruse, Ichihara (JP); Atsuo Otsuji, Chiba (JP); Mitsuo Nakamura, Chosei-gun (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 12/823,650

(22) Filed: Jun. 25, 2010

(65) Prior Publication Data

US 2010/0261866 A1 Oct. 14, 2010

Related U.S. Application Data

(63) Continuation of application No. 11/667,227, filed as application No. PCT/JP2005/021061 on Nov. 16, 2005, now Pat. No. 7,772,348.

(30) Foreign Application Priority Data

Nov. 16, 2004 (JP) ................................ 2004-332101

(51) Int. Cl.
C07F 7/00 (2006.01)
C07F 1/00 (2006.01)
C07F 3/00 (2006.01)
C08G 79/00 (2006.01)

(52) U.S. Cl. .............. 556/54; 556/56; 556/81; 556/113; 556/130; 528/9

(58) Field of Classification Search ............. 556/54, 556/56, 81, 113, 130; 528/9
See application file for complete search history.

(56) References Cited

U.S. PATENT DOCUMENTS 3,903,112 A 9/1975 Throckmorton et al.
6,641,805 B1 11/2003 Morita et al.

FOREIGN PATENT DOCUMENTS

| CN | 87108126 A | 9/1988 |
| EP | 0271839 A2 | 6/1988 |
| GB | 1016529 | 1/1966 |
| JP | 09-110979 | 4/1997 |
| JP | 09-302242 | 11/1997 |
| JP | 10-176081 | 6/1998 |
| JP | 11-140046 | 5/1999 |
| JP | 11-269231 | 10/1999 |
| JP | 11-322930 | 11/1999 |
| JP | 2001-296402 | 10/2001 |
| JP | 2003-261683 | 9/2003 |
| JP | 2003-327583 | 11/2003 |
| KR | 2001-0100851 A | 11/2001 |

OTHER PUBLICATIONS

Harpp et al., Letrahedron Letters, vol. 27, No. 34, pp. 3975-3978 (1986).*
English-language translation of Japanese Patent Publication No. 11-269231, 1999.
Jun'Ichi Uenishi et al., "Asymmetric Synthesis of Thietanose", Heterocycles, vol. 47, No. 1, Jan. 1, 1998, pp. 439-451.
Gerald Pattenden et al., "Natural 1,2-Dithiolane 1-Oxides. A Synthetic Approach Based on [2+2]-Cycloaddition Reactions with Thiones", Synlett, Sep. 1991, pp. 717-718.
Donald C. Dittmer et al., "Carbon-13 Chemical Shifts of 3-Substituted Thietanes, Thietane 1-Oxides and Thietane 1,1-Dioxides", Organic Magnetic Resonance, vol. 18, No. 2, Feb. 1982, pp. 82-86.
STN Database, Donald C. Dittmer et al., "Carbon-13 Chemical Shifts of 3-Substituted Thietanes, Thietane 1-Oxides and Thietane 1,1-Dioxides", Organic Magnetic Resonance, vol. 18, No. 2, Feb. 1982, pp. 82-86, Answer 1 of 1 CA Copyright 2003 ACS on STN.

* cited by examiner

*Primary Examiner* — Porfirio Nazario Gonzalez
(74) *Attorney, Agent, or Firm* — Buchanan Ingersoll & Rooney PC

(57) ABSTRACT

A compound having two or more thiol groups and an atom selected from metal atoms in a molecule, a polythiol composition containing such a compound, a polymerizable composition containing such a polythiol composition, a resin obtained by polymerization of such a polymerizable composition, and an optical component obtained from such a resin are provided. The polymerizable composition can be a raw material for a resin having high transparency, good heat resistance and mechanical strength required for optical components such as plastic lenses and the like, while attaining a high refractive index (nd) exceeding 1.7.

9 Claims, No Drawings

METAL-CONTAINING COMPOUND AND USE THEREOF

The present application is a Continuation application of U.S. application Ser. No. 11/667,227, filed May 8, 2007, which is the National Stage of International Application No. PCT/JP2005/021061, filed Nov. 16, 2005, and claims foreign priority to Japanese Application No. 2004-332101, filed Nov. 16, 2004, the entire contents of each of which are incorporated by reference herein.

TECHNICAL FIELD

The present invention relates to a compound having two or more thiol groups and an atom selected from metal atoms in a molecule, which is useful as a raw material monomer for a transparent resin having a high refractive index. Furthermore, the invention relates to a polythiol composition containing such a compound, a resin obtained by reacting and curing the compound or a polymerizable composition containing such a polythiol composition, and an optical component composed of such a resin.

BACKGROUND ART

Since an inorganic glass has excellent general properties such as excellent transparency and low optical anisotropy, the inorganic glass has been widely used in many fields as a transparent material. However, the inorganic glass has drawbacks such that it is heavy and easily broken, and has bad productivity when producing a product by molding and processing. As a result, a transparent organic polymer material (optical resin) has been used as a material in place of the inorganic glass. As the optical component obtained from such an optical resin, there are exemplified, for example, a spectacle lens for vision correction, and a plastic lens such as a camera lens of a digital camera and the like. The optical components have been put to practical use and have come into use. In particular, for the purpose of use in a spectacle lens for vision correction, the organic polymer material is lightweight and hardly broken, and can be dyed for granting great fashionability, as compared to the lens made of an inorganic glass. Making good use of such merits, the organic polymer material has been widely used.

In the past, a crosslinking type resin obtained by casting polymerization of diethylene glycol bisallylcarbonate as an optical resin used for a spectacle lens under heating (hereinafter referred to as DAC) has been put to practical use. It has merits such that transparency and heat resistance are excellent, and the chromatic aberration is low. Due to such merits, it has been used the most for a general-purpose plastic spectacle lens for vision correction. However, there are problems such that wearing comfort and fashionability are worsened and the like since the central or peripheral thickness (edge thickness) of the plastic lens becomes large because of the low refractive index (nd=1.50). Therefore, a resin for a plastic lens with a high refractive index capable of solving these problems has been demanded and developed accordingly.

During such a trend, polythiourethane containing a sulfur atom obtained by casting polymerization of diisocyanates with polythiols is excellent in its transparency and impact resistance, while attaining a high refractive index (nd=1.6 to 1.7), and having relatively low chromatic aberration and the like. By achieving such highly superior characteristics, polythiourethane has been used for the purpose of a high-quality plastic spectacle lens for vision correction in which the thickness is thin and its weight is light.

On the other hand, in a trend to pursue an optical resin having a much higher refractive index, there have been proposed several resins such as a transparent resin obtained by polymerization of a compound having an episulfide group in Patent Documents 1 and 2, a resin obtained by polymerization of a compound containing metal such as Se in Patent Documents 3 and 4 or the like. In recent years, there has been demanded an optical resin having required general properties (transparency, thermal properties, mechanical properties and the like) as a plastic lens, while attaining a much higher refractive index (nd) exceeding 1.7. The development of such an optical resin has been made.

[Patent Document 1] Japanese Patent Laid-Open No. 1997-110979
[Patent Document 2] Japanese Patent Laid-Open No. 1999-322930
[Patent Document 3] Japanese Patent Laid-Open No. 1999-140046
[Patent Document 4] Japanese Patent Laid-Open No. 2001-296402

DISCLOSURE OF THE INVENTION

An object of the present invention is to provide a polymerizable compound which has general properties (transparency, thermal properties, mechanical properties and the like) required for optical components such as plastic lenses, while attaining a very high refractive index (nd) exceeding 1.7, a resin obtained by polymerization of the compound, and an optical component composed of the resin.

In order to solve the above object, the present inventors have conducted an extensive study and, as a result, the present invention has been completed.

That is, the present invention relates to a compound having two or more thiol groups and an atom selected from metal atoms in a molecule.

As a concrete embodiment, the invention relates to the above compound in which the metal atom is an Sn atom, an Si atom, a Zr atom, a Ge atom, a Ti atom, a Zn atom, an Al atom, a Fe atom, a Cu atom, a Pt atom, a Pb atom, an Au atom or an Ag atom, and more preferably an Sn atom, an Si atom, a Zr atom, a Ti atom or a Ge atom. As another concrete embodiment, the invention relates to a compound represented by the general formula (1),

$$(Yq)_{n-m}\text{-}M\text{-}[\text{-}Xp\text{-}Rp\text{-}SH]_m \qquad (1)$$

wherein, in the formula, M represents an Sn atom, an Si atom, a Zr atom, a Ti atom or a Ge atom; Rp each independently represent a divalent organic group and may be bonded to each other for forming a group of a ring structure; Xp each independently represent a sulfur atom or an oxygen atom; Yq each independently represent a monovalent inorganic or organic group; m represents an integer of 2 to n; n represents a valency of a metal atom M; p represents an integer of 1 to m; q represents an integer of 1 to n-m; and when m is not less than 2, -(-Xp-Rp-SH) may be bonded to one another for forming a group of a ring structure.

Further, the invention relates to a polythiol composition containing the aforementioned compound, a polymerizable composition containing such a compound or such a polythiol composition, a resin obtained by polymerization of the above polymerizable composition, and an optical component composed of such a resin.

The resin obtained by polymerization of the compound of the present invention has high transparency, good heat resistance and mechanical strength, while attaining a high refractive index (nd) exceeding 1.7, and is useful as a resin used in an optical component such as a plastic lens or the like.

BEST MODE FOR CARRYING OUT THE INVENTION

The present invention will be described in more detail below.

The compound of the present invention is a compound characterized by its chemical structure having two or more thiol groups and an atom selected from metal atoms in a molecule.

The compound of the present invention is not particularly limited as far as the above conditions are satisfied, but concrete examples thereof include the following compounds including the compound in the following general formula (1).

The compound of the present invention is useful as a polymerizable compound because it contains a thiol group reacting with an isocyanate group, or an unsaturated carbon-carbon double bond such as a vinyl group, in a molecule. As described later, a resin obtained by the polymerization using the compound has characteristics such as transparency and high refractive index.

In the compound of the present invention, the metal atom is not particularly limited as far as it exhibits a desired effect. Preferable examples thereof include an Sn atom, an Si atom, a Zr atom, a Ge atom, a Ti atom, a Zn atom, an Al atom, a Fe atom, a Cu atom, a Pt atom, a Pb atom, an Au atom or an Ag atom. More preferable examples include an Sn atom, an Si atom, a Zr atom, a Ti atom or a Ge atom.

A preferable embodiment of the compound of the present invention is a compound represented by the general formula (1),

(Yq)n-m-M-[-Xp-Rp-SH]$_m$ (1)

wherein, in the formula, M represents an Sn atom, an Si atom, a Zr atom, a Ti atom or a Ge atom; Rp each independently represent a divalent organic group and may be bonded to each other for forming a group of a ring structure; Xp each independently represent a sulfur atom or an oxygen atom; Yq each independently represent a monovalent inorganic or organic group; m represents an integer of 2 to n; n represents a valency of a metal atom M; p represents an integer of 1 to m; q represents an integer of 1 to n-m; and when m is not less than 2, -(-Xp-Rp-SH) may be bonded to one another for forming a group of a ring structure.

In the general formula (1), M represents an Sn atom, an Si atom, a Zr atom, a Ti atom or a Ge atom.

In the general formula (1), Rp each independently represent a divalent organic group and may be bonded to each other for forming a group of a ring structure.

Concrete examples of the divalent organic group include a divalent chain or cyclic aliphatic group, an aromatic group or an aromatic-aliphatic group, preferably a divalent chain aliphatic group having 1 to 20 carbon atoms, a cyclic aliphatic group having 3 to 20 carbon atoms, an aromatic group having 5 to 20 carbon atoms and an aromatic-aliphatic group having 6 to 20 carbon atoms.

More specifically, this divalent organic group is preferably a substituted or unsubstituted chain or cyclic aliphatic group having 1 to 20 carbon atoms such as a methylene group, an ethylene group, a 1,2-dichloroethylene group, a trimethylene group, a tetramethylene group, a pentamethylene group, a cyclopentylene group, a hexamethylene group, a cyclohexylene group, a heptamethylene group, an octamethylene group, a nonamethylene group, a decamethylene group, an undecamethylene group, a dodecamethylene group, a tridecamethylene group, a tetradecamethylene group, a pentadecamethylene group and the like;

a substituted or unsubstituted aromatic group having 5 to 20 carbon atoms such as a phenylene group, a chlorophenylene group, a naphthylene group, an indenylene group, an anthracenylene group, a fluorenylene group and the like; and a substituted or unsubstituted aromatic-aliphatic group having 6 to 20 carbon atoms such as a —C$_6$H$_4$—CH$_2$— group, a —CH$_2$—C$_6$H$_4$—CH$_2$— group, a —CH$_2$—C$_6$H$_3$(Cl)—CH$_2$— group, a —C$_{10}$H$_6$—CH$_2$— group, a —CH$_2$—C$_{10}$H$_6$—CH$_2$— group, a —CH$_2$CH$_2$—C$_6$H$_4$—CH$_2$CH$_2$— group and the like, and more preferably a substituted or unsubstituted chain or cyclic aliphatic group having 1 to 6 carbon atoms such as a methylene group, an ethylene group, a 1,2-dichloroethylene group, a trimethylene group, a cyclopentylene group, a cyclohexylene group and the like;

a substituted or unsubstituted aromatic group having 5 to 15 carbon atoms such as a phenylene group, a chlorophenylene group, a naphthylene group, an indenylene group, an anthracenylene group, a fluorenylene group and the like; and a substituted or unsubstituted aromatic-aliphatic group having 6 to 15 carbon atoms such as a —C$_6$H$_4$—CH$_2$— group, a —CH$_2$—C$_6$H$_4$—CH$_2$— group, a —CH$_2$—C$_6$H$_3$(Cl)—CH$_2$— group, a —C$_{10}$H$_6$—CH$_2$— group, a —CH$_2$—C$_{10}$H$_6$—CH$_2$— group, a —CH$_2$CH$_2$—C$_6$H$_4$—CH$_2$CH$_2$— group and the like.

This divalent organic group may contain a hetero atom except for a carbon atom and a hydrogen atom in the group. Examples of the hetero atom include an oxygen atom or a sulfur atom. However, considering the desired effect of the present invention, a sulfur atom is preferably contained in the group.

In the general formula (1), Xp each independently represent a sulfur atom or an oxygen atom. Considering the desired effect of the present invention that is a high refractive index, Xp is more preferably a sulfur atom.

In the general formula (1), Yq each independently represent a monovalent inorganic or organic group.

Examples of the group include a halogen atom, a hydroxyl group, an alkyl group, an aryl group, an alkyloxy group, an alkylthio group, an aryloxy group and an arylthio group. More concrete examples include a halogen atom, a hydroxyl group, a substituted or unsubstituted alkyl group, a substituted or unsubstituted aryl group, a substituted or unsubstituted alkyloxy group, a substituted or unsubstituted alkylthio group, a substituted or unsubstituted aryloxy group and a substituted or unsubstituted arylthio group.

Concrete examples of the halogen atom include a fluorine atom, a chlorine atom, a bromine atom, and an iodine atom.

Concrete examples of the substituted or unsubstituted alkyl group include a straight chain alkyl group having 1 to 10 carbon atoms in total such as a methyl group, an ethyl group, an n-propyl group, an n-butyl group, an n-pentyl group, an n-hexyl group and the like;

a branched alkyl group having 3 to 10 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 1-n-propylbutyl group, a 1-iso-propylbutyl group, a 1-iso-propyl-2-methylpropyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 1-n-propylpentyl group, a 2-n-propylpentyl group, a 1-iso-propylpentyl group, a 2-iso-propylpentyl group, a 1-n-butylbutyl group, a 1-iso-butylbutyl group, a 1-sec-butylbutyl group, a 1-tert-butylbutyl group, a 2-tert-butylbutyl group, a tert-butyl group, a tert-pentyl group, a 1,1-dimethylbutyl group, a 1,2-dimethylbutyl group, a 1,3-dimethylbutyl group, a 2,3-dimethylbutyl group, a 1-ethyl-2-methylpropyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethyl-2-methylpentyl group, a 1-ethyl-3-methylpentyl group, a 1-ethyl-4-methylpentyl group, a 2-ethyl-1-methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1-n-propyl-1-methylbutyl group, a 1-n-propyl-2-methylbutyl group, a 1-n-propyl-3-methylbutyl group, a 1-iso-propyl-1-methylbutyl group, a 1-iso-propyl-2-methylbutyl group, a 1-iso-propyl-3-methylbutyl group, a 1,1-diethylbutyl group, a 1,2-diethylbutyl group, a 1,1,2-trimethylpropyl group, a 1,2,2-trimethylpropyl group, a 1,1,2-trimethylbutyl group, a 1,1,3-trimethylbutyl group, a 1,2,3-trimethylbutyl group, a 1,2,2-trimethylbutyl group, a 1,3,3-trimethylbutyl group, a 2,3,3-trimethylbutyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, a 2-ethyl-2,3-dimethylbutyl group and the like; and a saturated cyclic alkyl group having 5 to 10 carbon atoms in total such as a cyclopentyl group, a cyclohexyl group, a methylcyclopentyl group, a methoxycyclopentyl group, a methoxycyclohexyl group, a methylcyclohexyl group, a 1,2-dimethylcyclohexyl group, a 1,3-dimethylcyclohexyl group, a 1,4-dimethylcyclohexyl group, an ethylcyclohexyl group and the like.

Concrete examples of the substituted or unsubstituted aryl group include aromatic hydrocarbons having not more than 20 carbon atoms in total such as a phenyl group, a naphthyl group, an anthranyl group, a cyclopentadienyl group and the like;

an alkyl-substituted aryl group having not more than 20 carbon atoms in total such as a 2-methylphenyl group, a 3-methylphenyl group, a 4-methylphenyl group, a 2-ethylphenyl group, a propylphenyl group, a butylphenyl group, a hexylphenyl group, a cyclohexylphenyl group, an octylphenyl group, a 2-methyl-1-naphthyl group, a 3-methyl-1-naphthyl group, a 4-methyl-1-naphthyl group, a 5-methyl-1-naphthyl group, a 6-methyl-1-naphthyl group, a 7-methyl-1-naphthyl group, a 8-methyl-1-naphthyl group, a 1-methyl-2-naphthyl group, a 3-methyl-2-naphthyl group, a 4-methyl-2-naphthyl group, a 5-methyl-2-naphthyl group, a 6-methyl-2-naphthyl group, a 7-methyl-2-naphthyl group, a 8-methyl-2-naphthyl group, a 2-ethyl-1-naphthyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 20 carbon atoms in total wherein a substituted or unsubstituted alkyloxy group having not more than 10 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group, a hexyloxyphenyl group, a cyclohexyloxyphenyl group, an octyloxyphenyl group, a 2-methoxy-1-naphthyl group, a 3-methoxy-1-naphthyl group, a 4-methoxy-1-naphthyl group, a 5-methoxy-1-naphthyl group, a 6-methoxy-1-naphthyl group, a 7-methoxy-1-naphthyl group, a 8-methoxy-1-naphthyl group, a 1-methoxy-2-naphthyl group, a 3-methoxy-2-naphthyl group, a 4-methoxy-2-naphthyl group, a 5-methoxy-2-naphthyl group, a 6-methoxy-2-naphthyl group, a 7-methoxy-2-naphthyl group, a 8-methoxy-2-naphthyl group, a 2-ethoxy-1-naphthyl group and the like;

a dialkoxyaryl group having not more than 20 carbon atoms in total wherein a substituted or unsubstituted alkyloxy group having not more than 10 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 4,5-dimethoxy-1-naphthyl group, a 4,7-dimethoxy-1-naphthyl group, a 4,8-dimethoxy-1-naphthyl group, a 5,8-dimethoxy-1-naphthyl group, a 5,8-dimethoxy-2-naphthyl group and the like;

a trialkoxyaryl group having not more than 20 carbon atoms in total wherein a substituted or unsubstituted alkyloxy group having nor more than 10 carbon atoms is substituted, such as a 2,3,4-trimethoxyphenyl group, a 2,3,5-trimethoxyphenyl group, a 2,3,6-trimethoxyphenyl group, a 2,4,5-trimethoxyphenyl group, a 2,4,6-trimethoxyphenyl group, a 3,4,5-trimethoxyphenyl group and the like; and an aryl group having not more than 20 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Concrete examples of the substituted or unsubstituted alkyloxy group include a straight chain or branched alkoxy group having 1 to 10 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group and the like;

a cycloalkoxy group having 5 to 10 carbon atoms in total such as a cyclopentyloxy group, a cyclohexyloxy group and the like; and an alkoxyalkoxy group having 1 to 10 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group, an n-pentyloxyethoxy group, an iso-pentyloxyethoxy group, an n-hexyloxyethoxy group, an iso-hexyloxyethoxy group, an n-heptyloxyethoxy group and the like; and an aralkyloxy group such as a benzyloxy group.

Concrete examples of the substituted or unsubstituted alkylthio group include a straight chain or branched alkylthio group having 1 to 10 carbon atoms in total such as a methylthio group, an ethylthio group, an n-propylthio group, an i-propylthio group, an n-butylthio group, an i-butylthio group, a sec-butylthio group, a t-butylthio group, an n-pentylthio group, an iso-pentylthio group, an n-hexylthio group, an iso-hexylthio group, a 2-ethylhexylthio group, a 3,5,5-trimethylhexylthio group, an n-heptylthio group, an n-octylthio group, an n-nonylthio group and the like;

a cycloalkylthio group having 5 to 10 carbon atoms in total such as a cyclopentylthio group, a cyclohexylthio group and the like;

an alkoxyalkylthio group having 1 to 10 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group, an n-pentyloxyethylthio group, an iso-pentyloxyethylthio group, an n-hexyloxyethylthio group, an iso-hexyloxyethylthio group, an n-heptyloxyethylthio group and the like; an aralkylthio group such as a benzylthio group and the like; and an alkylthioalkylthio group having 1 to 10 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group, an n-pentylthioethylthio group, an iso-pentylthioethylthio group, an n-hexylthioethylthio group, an iso-hexylthioethylthio group, an n-heptylthioethylthio group and the like.

Concrete examples of the substituted or unsubstituted aryloxy group include an unsubstituted or alkyl-substituted aryloxy group having not more than 20 carbon atoms in total such as a phenyloxy group, a naphthyloxy group, an anthranyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, an octylphenyloxy group, a 2-methyl-1-naphthyloxy group, a 3-methyl-1-naphthyloxy group, a 4-methyl-1-naphthyloxy group, a 5-methyl-1-naphthyloxy group, a 6-methyl-1-naphthyloxy group, a 7-methyl-1-naphthyloxy group, a 8-methyl-1-naphthyloxy group, a 1-methyl-2-naphthyloxy group, a 3-methyl-2-naphthyloxy group, a 4-methyl-2-naphthyloxy group, a 5-methyl-2-naphthyloxy group, a 6-methyl-2-naphthyloxy group, a 7-methyl-2-naphthyloxy group, a 8-methyl-2-naphthyloxy group, a 2-ethyl-1-naphthyloxy group, a 2,3-dimethylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 20 carbon atoms in total wherein a substituted or unsubstituted alkyloxy group having not more than 10 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group, an octyloxyphenyloxy group, a 2-methoxy-1-naphthyloxy group, a 3-methoxy-1-naphthyloxy group, a 4-methoxy-1-naphthyloxy group, a 5-methoxy-1-naphthyloxy group, a 6-methoxy-1-naphthyloxy group, a 7-methoxy-1-naphthyloxy group, a 8-methoxy-1-naphthyloxy group, a 1-methoxy-2-naphthyloxy group, a 3-methoxy-2-naphthyloxy group, a 4-methoxy-2-naphthyloxy group, a 5-methoxy-2-naphthyloxy group, a 6-methoxy-2-naphthyloxy group, a 7-methoxy-2-naphthyloxy group, a 8-methoxy-2-naphthyloxy group, a 2-ethoxy-1-naphthyloxy group and the like;

a dialkoxyaryloxy group having not more than 20 carbon atoms in total wherein a substituted or unsubstituted alkyloxy group having not more than 10 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group, a 4,5-dimethoxy-1-naphthyloxy group, a 4,7-dimethoxy-1-naphthyloxy group, a 4,8-dimethoxy-1-naphthyloxy group, a 5,8-dimethoxy-1-naphthyloxy group, a 5,8-dimethoxy-2-naphthyloxy group and the like;

a trialkoxyaryloxy group having not more than 20 carbon atoms in total wherein a substituted or unsubstituted alkyloxy group having not more than 10 carbon atoms is substituted, such as a 2,3,4-trimethoxyphenyloxy group, a 2,3,5-trimethoxyphenyloxy group, a 2,3,6-trimethoxyphenyloxy group, a 2,4,5-trimethoxyphenyloxy group, a 2,4,6-trimethoxyphenyloxy group, a 3,4,5-trimethoxyphenyloxy group and the like; and an aryloxy group having not more than 20 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Concrete examples of the substituted or unsubstituted arylthio group include an unsubstituted or alkyl-substituted arylthio group having not more than 20 carbon atoms in total such as a phenylthio group, a naphthylthio group, an anthranylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, an octylphenylthio group, a 2-methyl-1-naphthylthio group, a 3-methyl-1-naphthylthio group, a 4-methyl-1-naphthylthio group, a 5-methyl-1-naphthylthio group, a 6-methyl-1-naphthylthio group, a 7-methyl-1-naphthylthio group, a 8-methyl-1-naphthylthio group, a 1-methyl-2-naphthylthio group, a 3-methyl-2-naphthylthio group, a 4-methyl-2-naphthylthio group, a 5-methyl-2-naphthylthio group, a 6-methyl-2-naphthylthio group, a 7-methyl-2-naphthylthio group, a 8-methyl-2-naphthylthio group, a 2-ethyl-1-naphthylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 20 carbon atoms in total wherein a substituted or unsubstituted alkyloxy group having not more than 10 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group, an octyloxyphenylthio group, a 2-methoxy-1-naphthylthio group, a 3-methoxy-1-naphthylthio group, a 4-methoxy-1-naphthylthio group, a 5-methoxy-1-naphthylthio group, a 6-methoxy-1-naphthylthio group, a 7-methoxy-1-naphthylthio group, a 8-methoxy-1-naphthylthio group, a 1-methoxy-2-naphthylthio group, a 3-methoxy-2-naphthylthio group, a 4-methoxy-2-naphthylthio group, a 5-methoxy-2-naphthylthio group, a 6-methoxy-2-naphthylthio group, a 7-methoxy-2-naphthylthio group, a 8-methoxy-2-naphthylthio group, a 2-ethoxy-1-naphthylthio group and the like;

a dialkoxyarylthio group having not more than 20 carbon atoms in total wherein a substituted or unsubstituted alkyloxy group having not more than 10 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like;

a trialkoxyarylthio group having not more than 20 carbon atoms in total wherein a substituted or unsubstituted alkyloxy group having not more than 10 carbon atoms is substituted, such as a 2,3,4-trimethoxyphenylthio group, a 2,3,5-trimethoxyphenylthio group, a 2,3,6-trimethoxyphenylthio group, a 2,4,5-trimethoxyphenylthio group, a 2,4,6-trimethoxyphenylthio group, a 3,4,5-trimethoxyphenylthio group and the like; and an arylthio group having not more than 20 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like. However, the present invention is not restricted thereto.

Yq preferably represent a hydrogen atom. Preferable examples of the halogen atom include a chlorine atom, a bromine atom and an iodine atom.

Preferable examples of the substituted or unsubstituted alkyl group include a straight chain alkyl group having 1 to 6 carbon atoms in total such as a methyl group, an ethyl group, an n-propyl group, an n-butyl group, an n-pentyl group, an n-hexyl group and the like;

a branched alkyl group having 3 to 6 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a tert-butyl group, a tert-pentyl group, a 1,1-dimethylbutyl group, a 1,2-dimethylbutyl group, a 1,3-dimethylbutyl group, a 2,3-dimethylbutyl group and the like; and a saturated cyclic alkyl group having 5 to 6 carbon atoms in total such as a cyclopentyl group, a cyclohexyl group and the like.

Preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 12 carbon atoms in total such as a 2-methylphenyl group, a 3-methylphenyl group, a 4-methylphenyl group, a 2-ethylphenyl group, a propylphenyl group, a butylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 12 carbon atoms in total wherein a substituted or unsubstituted alkyloxy group having not more than 6 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group and the like;

a dialkoxyaryl group having not more than 12 carbon atoms in total wherein a substituted or unsubstituted alkyloxy group having not more than 6 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Preferable examples of the substituted or unsubstituted alkyloxy group include a straight chain or branched alkoxy group having 1 to 6 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group and the like;

a cycloalkoxy group having 5 to 6 carbon atoms in total such as a cyclopentyloxy group, a cyclohexyloxy group and the like; and an alkoxyalkoxy group having 1 to 6 carbon atoms in total such as a methoxymethoxy group, an ethoxymethoxy group, an ethoxyethoxy group, an n-propoxymethoxy group, an isopropoxymethoxy group, an n-propoxyethoxy group, an iso-propoxyethoxy group, an n-butoxyethoxy group, an iso-butoxyethoxy group, a tert-butoxyethoxy group and the like.

Preferable examples of the substituted or unsubstituted alkylthio group include a straight chain or branched alkylthio group having 1 to 6 carbon atoms in total such as a methylthio group, an ethylthio group, an n-propylthio group, an i-propylthio group, an n-butylthio group, an i-butylthio group, a sec-butylthio group, a t-butylthio group, an n-pentylthio group, an iso-pentylthio group, an n-hexylthio group, an iso-hexylthio group and the like;

a cycloalkylthio group having 5 to 6 carbon atoms in total such as a cyclopentylthio group, a cyclohexylthio group and the like;

an alkoxyalkylthio group having 1 to 6 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group and the like; and an alkylthioalkylthio group having 1 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

Preferable examples of the substituted or unsubstituted aryloxy group include an unsubstitued or alkyl-substituted aryloxy group having not more than 12 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 12 carbon atoms in total wherein a substituted or unsubstituted alkyloxy group having not more than 6 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group and the like;

a dialkoxyaryloxy group having not more than 12 carbon atoms in total wherein a substituted or unsubstituted alkyloxy group having not more than 6 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Preferable examples of the substituted or unsubstituted arylthio group include an unsubstituted or alkyl-substituted arylthio group having not more than 12 carbon atoms in total such as a phenylthio group, a naphthylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 12 carbon atoms in total wherein a substituted or unsubstituted alkyloxy group having not more than 6 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group and the like;

a dialkoxyarylthio group having not more than 12 carbon atoms in total wherein a substituted or unsubstituted alkyloxy group having not more than 6 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like.

More preferable example includes a hydrogen atom.

More preferable examples of the halogen atom include a chlorine atom and a bromine atom.

More preferable examples of the substituted or unsubstituted alkyl group include a straight chain or branched alkyl group having 1 to 3 carbon atoms in total such as a methyl group, an ethyl group, an iso-propyl group and the like.

More preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 9 carbon atoms in total such as a 2-methylphenyl group, a 3-methylphenyl group, a 4-methylphenyl group, a 2-ethylphenyl group, a propylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group and the like;

a monoalkoxyaryl group having not more than 9 carbon atoms in total wherein a substituted or unsubstituted alkyloxy group having not more than 3 carbon atoms is substituted, such as a 2-methoxyphenyl group, a 3-methoxyphenyl group, a 4-methoxyphenyl group, a 2-ethoxyphenyl group, a propoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, a chloronaphthyl group, a bromonaphthyl group and the like.

More preferable examples of the substituted or unsubstituted alkyloxy group include a straight chain or branched alkoxy group having 1 to 3 carbon atoms in total such as a methoxy group, an ethoxy group, an iso-propoxy group and the like; and a cycloalkoxy group having 5 to 6 carbon atoms in total such as a cyclopentyloxy group, a cyclohexyloxy group and the like.

More preferable examples of the substituted or unsubstituted alkylthio group include a straight chain or branched alkylthio group having 1 to 3 carbon atoms in total such as a methylthio group, an ethylthio group, an n-propylthio group, an i-propylthio group and the like;

a cycloalkylthio group having 5 to 6 carbon atoms in total such as a cyclopentylthio group, a cyclohexylthio group and the like; and an alkylthioalkylthio group having 1 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

More preferable examples of the substituted or unsubstituted aryloxy group include an unsubstitued or alkyl-substituted aryloxy group having not more than 9 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group and the like;

a monoalkoxyaryloxy group having not more than 9 carbon atoms in total wherein a substituted or unsubstituted alkyloxy group having not more than 3 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, a chloronaphthyloxy group, a bromonaphthyloxy group and the like.

More preferable examples of the substituted or unsubstituted arylthio group include an unsubstitued or alkyl-substituted arylthio group having not more than 9 carbon atoms in total such as a phenylthio group, a 2-methylphenylthio group, a 3-methylphenylthio group, a 4-methylphenylthio group, a 2-ethylphenylthio group, a propylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group and the like;

a monoalkoxyarylthio group having not more than 9 carbon atoms in total wherein a substituted or unsubstituted alkyloxy group having not more than 3 carbon atoms is substituted, such as a 2-methoxyphenylthio group, a 3-methoxyphenylthio group, a 4-methoxyphenylthio group, a 2-ethoxyphenylthio group, a propoxyphenylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, a chloronaphthylthio group, a bromonaphthylthio group and the like.

In the general formula (1), m represents an integer of 2 to n. Such m is preferably an integer of n or n−1 and more preferably an integer of n.

In the present invention, m in the general formula (1) is usually an integer of 2 to 4 by n representing a valency of a metal atom M.

In the general formula (1), n represents a valency of a metal atom M.

Namely, for example, when M is an Sn atom or a Ti atom, n is an integer of 2 or 4, and preferably an integer of 4. Furthermore, when M is a Zr atom, an Si atom or a Ge atom, n is 4.

n in the general formula (1) is preferably an integer of 2 to 4 and more preferably an integer of 2 or 4.

In the general formula (1), p represents an integer of 1 to m. Further, in the general formula (1), q represents an integer of 1 to n-m.

That is, for example, when M is a tetravalent Sn atom (n=4) and m=4, p represents a number each of an integer of 1 to 4 per each group, having four kinds of groups of $R_1$, $R_2$, $R_3$ and $R_4$. As described above, these groups of $R_1$ to $R_4$ may be the same groups or each independently different groups. Furthermore, for example, $R_1$ and $R_2$ and/or $R_3$ and $R_4$ may be bonded to each other for forming a group of a ring structure.

Meanwhile, for example, when M is a tetravalent Sn atom (n=4) and m=2, p represents a number each of an integer of 1 to 2 per each group, having two kinds of groups of $R_1$ and $R_2$. As described above, these $R_1$ and $R_2$ may be the same groups or each independently different groups. Further, for example, $R_1$ and $R_2$ may be bonded to each other for forming a group of a ring structure.

At this time, q represents a number of 1 to 2, having two kinds of groups of $Y_1$ and $Y_2$. As described above, these $Y_1$ and $Y_2$ groups may be the same groups or each independently different groups.

Furthermore, in the general formula (1), when m is an integer of 2 or more, -(-Xp-Rp-SH) may be bonded to one another for forming a group of a ring structure.

In this case, SH groups at ends may be directly bonded to each other (single bond) or may be bonded through the intermediary of a linking group comprising an atom such as a carbon atom, an oxygen atom, a sulfur atom and the like or an organic group and the like.

Furthermore, Rp groups in the middle of group may be directly bonded to each other or an SH group at one end of group and an Rp group in the middle of the other group may be directly bonded (single bond), or may be bonded through the intermediary of the aforementioned linking group.

Concrete examples of the above linking group include the same as those in the aforementioned divalent organic group.

Typical examples of the compound represented by the general formula (1) include the following examples, but the present invention is not restricted thereto.

| Compound Nos. | |
|---|---|
| (1-1) | |
| (1-2) | |
| (1-3) | |
| (1-4) | |
| (1-5) | |
| (1-6) | |
| (1-7) | |
| (1-8) | |

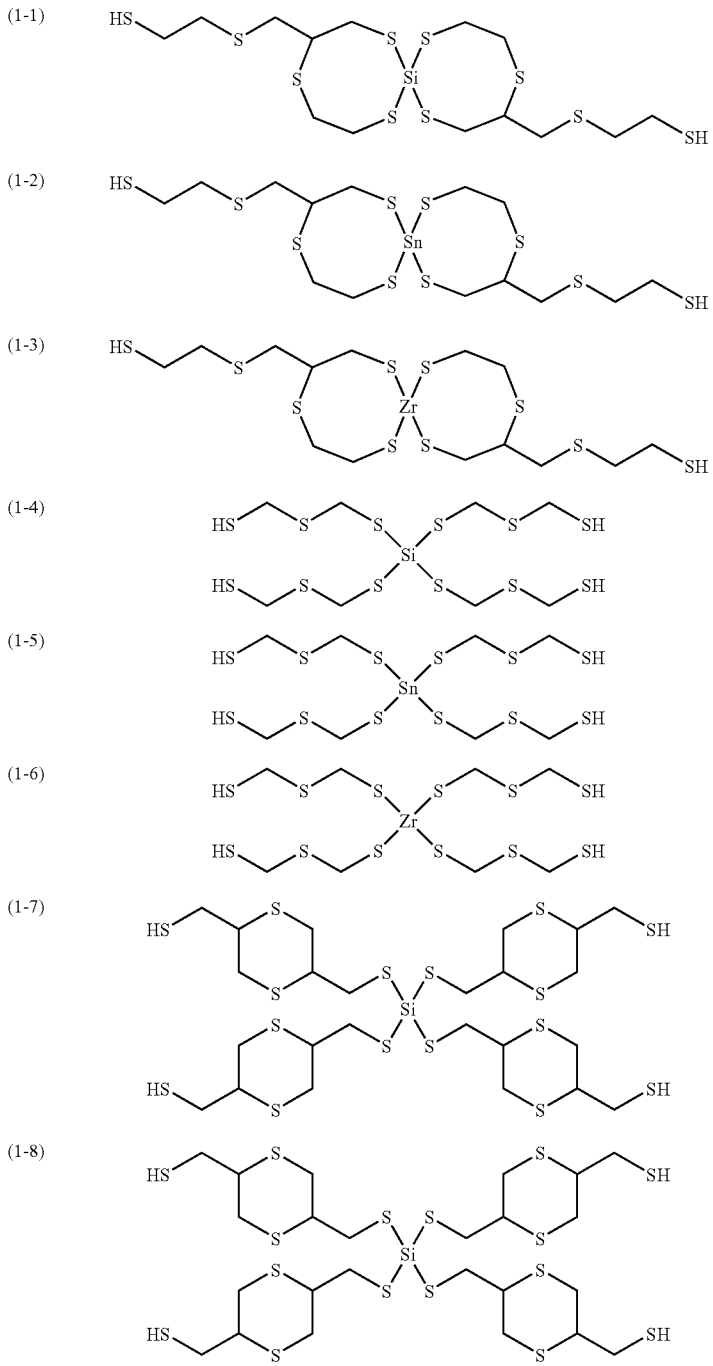

The compound of the present invention having two or more thiol groups and an atom selected from metal atoms in a molecule, represented by the compound in the general formula (1) is typically prepared, for example, by the reaction of a metal halide represented by the general formula (2) with a polythiol compound containing two or more thiol groups in a molecule.

(Yq)n-m-M-(Z)m     (2)

wherein, in the formula, M, Y, m, n and q are the same as those described before; and Z represents a halogen atom.

The metal compound represented by the general formula (2) can be available as an industrial raw material or a reagent.

A known compound is suitably used as a polythiol compound, such a compound is typically prepared in accordance with a method as described, for example, in Japanese Patent Laid-open No. 2001-342252, Japanese Patent Laid-open No. 2001-342172, Japanese Patent Laid-open No. 1997-52391, Japanese Patent Laid-open No. 1989-215984 and the like. Of course, some compounds of these polythiol compounds can be available as an industrial raw material or a reagent.

A method for preparing the compound of the present invention represented by the general formula (1) according to the reaction of the metal halide represented by the general formula (2) with the polythiol compound will be described hereinafter.

The reaction may be carried out without a solvent or in the presence of an organic solvent which is inactive to the reaction. The organic solvents are not particularly limited as long as they are organic solvent which are inactive to the reaction. Examples thereof include hydrocarbon solvents such as petroleum ether, hexane, benzene, toluene, xylene, mesitylene and the like; ether solvents such as diethyl ether, tetrahydrofuran, diethylene glycol dimethyl ether and the like; ketone solvents such as acetone, methyl ethyl ketone, methyl isobutyl ketone and the like; ester solvents such as ethyl acetate, butyl acetate, amyl acetate and the like; chlorine-containing solvents such as dichloromethane, chloroform, chlorobenzene, dichlorobenzene and the like; and polar aprotic solvents such as N,N-dimethylformamide, N,N-dimethylacetamide, N,N-dimethylimidazolidinone, dimethyl sulfoxide and the like.

The reaction temperature is not particularly limited, but it is usually in the range of from −78 to 200 degree centigrade and preferably from −78 to 100 degree centigrade.

The reaction time is affected by the reaction temperature, but it is usually from several minutes to 100 hours.

The amount of the compound represented by the general formula (2) and the raw material polythiol compound used in the reaction is not particularly limited, but the amount of the polythiol compound is usually from 0.01 to 100 moles, based on 1 mole of the compound represented by the general formula (2).

The amount is preferably from 0.1 to 50 moles and more preferably from 0.5 to 20 moles.

When carrying out the reaction, it is preferable to use a basic compound as a scavenger of the generated hydrogen halogenide for effectively carrying out the reaction. Examples of the basic compound include inorganic bases such as sodium hydroxide, potassium hydroxide, lithium hydroxide, sodium carbonate, potassium carbonate, lithium carbonate, sodium bicarbonate, potassium bicarbonate, lithium bicarbonate, magnesium hydroxide, calcium hydroxide and the like; and organic bases such as pyridine, triethylamine, dimethylaniline, diethylaniline, 1,8-diazabicyclo[5,4,0]-7-undecene and the like.

As needed, the compound represented by the general formula (1) of the present invention may be purified and taken out to be used as a single compound or a composition containing a raw material polythiol compound, a compound having a different structure in the general formula (1), or by-products such as a polythiol compound of an oligomer form or the like may also be used as it is.

The polythiol composition of the present invention contains a thiol compound having two or more thiol groups and an atom selected from metal atoms in a molecule which be obtained in the above reaction and containing a thiol compound having as an essential component, and may contain other thiol compounds in addition to such an essential component.

The polythiol composition of the present invention contains a thiol compound obtained by the above mentioned reaction, having two or more thiol groups and an atom selected from metal atoms in a molecule, as an essential component, and may contain other thiol compounds not involving such an essential component.

Examples of the other thiol compound include aliphatic polythiol compounds such as methanedithiol, ethanedithiol, 1,1-propanedithiol, 1,2-propanedithiol, 1,3-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropanebis(2-mercaptoacetate), trimethylolpropanebis(3-mercaptopropionate), pentaerythritol tetrakis(2-mercaptoacetate), pentaerythritol tetrakis(3-mercaptopropionate), tetrakis(mercaptomethyl)methane and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and the like;

aromatic polythiol compound containing a sulfur atom(s) in addition to the mercapto groups such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene and the like, and the nucleusalkylated compound of these polythiols;

aliphatic polythiol compounds containing a sulfur atom(s) in addition to the mercapto group such as bis(mercaptomethyl)sulfide, bis(mercaptoethyl)sulfide, bis(mercaptopropyl)sulfide, bis(2-mercaptoethylthio)methane, bis(3-mercaptopropylthio)methane, 1,2-bis(2-mercaptoethylthio)ethane, 1,2-bis(3-mercaptopropyl)ethane, 1,3-bis(2-mercaptoethylthio)propane, 1,3-bis(3-mercaptopropylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptoethyl)disulfide, bis(mercaptopropyl)disulfide and the like, and esters of thioglycolic acid of these compounds with mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3- mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diolbis(2-mercaptoacetate), 1,4-dithiane-2,5-diolbis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), dithiodipropionic acid bis(2,3-dimercaptopropyl ester) and the like;

heterocyclic compounds containing a sulfur atom(s) in addition to the mercapto group such as 3,4-thiophenedithiol, 2,5-dimercapto-1,3,4-thiadiazol and the like; and compounds containing a hydroxy group (s) in addition to the mercapto group such as 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris (3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyl-tris(mercaptoethylthiomethyl)methane, 1-hydroxyethylthio-3-mercaptoethylthiobenzene and the like. Furthermore, halogen-substituted products such as chlorine-substituted products, bromine-substituted products or the like of these compounds may also be used.

In the polythiol composition of the present invention, the proportion of each component constituting the composition is not particularly limited, but it is preferably as follows.

That is, the content of the thiol compound as described in claim 1 of the present invention is not particularly limited, but it is usually not less than 10% by weight, preferably not less than 20% by weight, more preferably not less than 30% by weight, and further preferably not less than 50% by weight, based on the total weight of the polythiol composition of the present invention.

The content of other thiol compounds is not particularly limited, but it is usually not more than 80% by weight, preferably not more than 70% by weight, more preferably not more than 60% by weight and further preferably not more than 40% by weight, based on the total weight of the polythiol composition of the present invention.

The polymerizable composition of the present invention may contain a compound having two or more thiol groups and an atom selected from metal atoms in a molecule, and other compounds are not particularly limited. The polythiol compound of the present invention is not particularly limited as far as such components are self-polymerizable and preferably reacted with the polythiol compound of the present invention for polymerization. In this case, the compound of the present invention represented by the compound in the general formula (1) may be used singly or a plurality of other compounds may be used together.

Further, the polymerizable composition of the present invention preferably contains the compound represented by the general formula (1).

The polymerizable composition of the present invention more preferably contains (A) a thiol compound having two or more thiol groups and an atom selected from metal atoms in a molecule or a polythiol composition containing the thiol compound as an essential component and (B) a compound having a functional group reacting with a thiol group.

Here, examples of (B) the compound having a functional group reacting with a thiol group include an iso(thio)cyanate compound, a (thio)epoxy compound or a compound having an unsaturated carbon-carbon double bond such as a (meth) acryl group, a vinyl group and the like (hereinafter referred to as an ene-compound).

These compounds are not particularly limited, and an iso (thio)cyanate compound, a polyiso(thio)cyanate compound, a (thio)epoxy compound, a (meth)acrylate compound, a vinyl compound and the like as described, for example, in Japanese Patent Laid-open No. 2001-342252 and the like are used.

Concrete examples of the iso(thio)cyanate compound and polyiso(thio)cyanate compound include aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatemethyloctane, bis (isocyanatoethyl)carbonate, bis(isocyanatoethyl)ether, lysine diisocyanate methyl ester, lysine triisocyanate, xylylene diisocyanate, bis(isocyanatoethyl)benzene, bis(isocyanatoeepropyl)benzene, α,α,α',α'-tetramethylxylylene diisocyanate, bis(isocyanatobutyl)benzene, bis(isocyanatomethyl)naphthalene, bis(isocyanatomethylphenyl) ether, bis(isocyanatoethyl)phthalate, 2,6-di(isocyanatomethyl)furan and the like;

alicyclic polyisocyanate compounds such as isophorone diisocyanate, bis(isocyanatomethyl)cyclohexane, cyclohexane diisocyanate, methylcyclohexane diisocyanate, 4,4'-methylene bis(cyclohexyl isocyanate), 4,4'-methylene bis(2-methylcyclohexyl isocyanate), 2,5-bis(isocyanatomethyl) bicyclo-[2,2,1]-heptane, 2,6-bis(isocyanatomethyl)bicyclo-[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like;

aromatic polyisocyanate compounds such as 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, tolidine diisocyanate, 4,4'-methylene bis(phenyl isocyanate), 4,4'-methylene bis(2-methylphenyl isocyanate), bibenzyl-4,4'-diisocyanate, bis(isocyanatophenyl)ethylene and the like;

aliphatic sulfur-containing polyisocyanate compounds such as bis(isocyanatomethyl)sulfide, bis(isocyanatoethyl) sulfide, bis(isocyanatopropyl)sulfide, bis(isocyanatohexyl) sulfide, bis(isocyanatomethyl)sulfone, bis(isocyanatomethyl)disulfide, bis(isocyanatoethyl)disulfide, bis (isocyanatopropyl)disulfide, bis(isocyanatomethylthio) methane, bis(isocyanatoethylthio)methane, bis (isocyanatoethylthio)ethane, bis(isocyanatomethylthio) ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octane diisocyanate and the like;

aromatic sulfide based polyisocyanate compounds such as 2-isocyanatophenyl-4-isocyanatophenylsulfide, bis(4-isocyanatophenyl)sulfide, bis(4-isocyanatomethylphenyl)sulfide and the like;

aromatic disulfide based polyisocyanate compounds such as bis(4-isocyanatophenyl)disulfide, bis(2-methyl-5-isocyanatophenyl)disulfide, bis(3-methyl-5-isocyanatophenyl)disulfide, bis(3-methyl-6-isocyanatophenyl)disulfide, bis(4-methyl-5-isocyanatophenyl)disulfide, bis(3-methoxy-4-isocyanatophenyl)disulfide, bis(4-methoxy-3-isocyanatophenyl)disulfide and the like;

alicyclic sulfur-containing polyisocyanate compounds such as 2,5-diisocyanatotetrahydrothiophene, 2,5-diisocyanato-methyltetrahydrothiophene, 3,4-diisocyanato-methyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane, 4,5-diisocyanatomethyl-2-methyl-1,3-dithiolane and the like;

aliphatic polyisothiocyanate compounds such as 1,2-diisothiocyanatoethane, 1,6-diisothiocyanatohexane and the like;

alicyclic polyisothiocyanate compounds such as cyclohexane diisothiocyanate and the like; and aromatic polyisothiocyanate compounds such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanatobiphenyl, 4,4'-methylene bis(phenyl)sothiocyanate), 4,4'-methylene bis(2-methylphenylisothiocyanate), 4,4'-methylene bis(3-methylphenylisothiocyanate), 4,4'-isopropylidene bis(phenyl)sothiocyanate), 4,4'-diisothiocyanatobenzophenone, 4,4'-diisothiocyanato-3,3'-dimethylbenzophenone, bis(4-isothiocyanatophenyl)ether and the like.

Further examples thereof include carbonyl polyisothiocyanate compounds such as 1,3-benzenedicarbonyl diisothiocyanate, 1,4-benzenedicarbonyl diisothiocyanate, (2,2-pyridine)-4,4-dicarbonyl diisothiocyanate and the like;

aliphatic sulfur-containing polyisothiocyanate compounds such as thiobis(3-isothiocyanatopropane), thiobis(2-isothiocyanatoethane), dithiobis(2-isothiocyanatoethane) and the like;

aromatic sulfur-containing polyisothiocyanate compounds such as 1-isothiocyanato-4-[(2-isothiocyanate)sulfonyl]benzene, thiobis(4-isothiocyanatobenzene), sulfonyl bis(4-isothiocyanatobenzene), dithiobis(4-isothiocyanato benzene) and the like;

alicyclic sulfur-containing polyisothiocyanate compounds such as 2,5-diisothiocyanatothiophene, 2,5-diisothiocyanato-1,4-dithiane and the like; and compounds having an isocyanate group and an isothiocyanate group such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenyl sulfide, 2-isocyanatoethyl-2-isothiocyanatoethyl disulfide and the like.

Furthermore, there can also be used halogen-substituted products of these compounds such as a chlorine-substituted product, a bromine-substituted product or the like, alkyl-substituted products, alkoxy-substituted products and nitro-substituted products of these compounds or prepolymer-modified products which are reaction products of these compounds with polyhydric alcohols, carbodiimide-modified products, urea-modified products, burette-modified products, and dimerization or trimerization reaction products of these compounds.

Examples of the (thio)epoxy compound include chain aliphatic 2,3-epithiopropylthio compounds such as bis(2,3-epithiopropyl)disulfide, bis(2,3-epithiopropyl)sulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 3,8-bis(2,3-epithiopropylthio)-3,6-dithiaoctane, 1,2,3-tris(2,3-epithiopropylthio)propane, 2,2-bis(2,3-epithiopropylthiomethyl)-1,3-bis(2,3-epithiopropyl thio) propane, 2,2-bis(2,3-epithiopropylthiomethyl)-1-(2,3-epithiopropylthio) butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris{[2-(2,3-epithiopropylthio)ethyl]thiomethyl}-2-(2,3-epithiopropylthio)ethane, 1,1,2,2-tetrakis{[2-(2,3-epithiopropylthio)ethyl]thiomethyl}ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, 1,11-bis(2,3-epithiopropylthio)-5,7-bis(2,3-epithiopropylthiomethyl)-3,6,9-trithiaundecane and the like; cyclic aliphatic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis{[2-(2,3-epithiopropylthio)ethyl]thiomethyl}-1,4-dithiane, 2,5-bis(2,3-epithiopropylthiomethyl)-2,5-dimethyl-1,4-dithiane and the like; and aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl]sulfide, bis[4-(2,3-epithiopropylthio)phenyl]sulfone, 4,4'-bis(2,3-epithiopropylthio)biphenyl and the like. Further examples thereof include mercapto group-containing epithio compounds such as 3-mercaptopropylene sulfide, 4-mercaptobutene sulfide and the like.

Examples of the (meth)acrylate compound and the vinyl compound include (meth)acrylate compounds such as benzyl (meth)acrylate, butoxyethyl (meth)acrylate, butoxymethyl (meth)acrylate, cyclohexyl (meth)acrylate, 2-hydroxyethyl (meth)acrylate, glycidyl (meth)acrylate, thioglycidyl (meth) acrylate, phenoxyethyl (meth)acrylate, phenyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, neopentyl glycol di(meth)acrylate, bisphenol A di(meth)acrylate, 2,2-bis(4-(meth)acryloyloxyethoxyphenyl)propane, 2,2-bis(4-(meth)acryloyloxyethoxyethoxyphenyl)propane, bisphenol F di(meth)acrylate, bis(4-(meth)acryloyloxyethoxyphenyl)methane, 1,1-bis(4-(meth)acryloxyethoxyethoxyphenyl)methane, trimethylolpropane tri(meth)acrylate, glycerol di(meth)acrylate, pentaerythritol tri(meth)acrylate, pentaerythritol tetra(meth)acrylate and the like; thio(meth)acrylate compounds such as (meth)acryloylthioethane, (meth)acryloylthiomethylbenzene, 1,2-bis[(meth)acryloylthio]ethane, 1,3-bis[(meth)acryloylthio]propane, 1,4-bis[(meth)acryloylthio]butane, 1,6-bis[(meth)acryloylthio]hexane, bis[2-(meth)acryloylthioethyl]ether, bis[2-(meth)acryloylthioethyl]sulfide, bis[2-(meth)acryloylthioethylthio]methane, 1,2-bis[2-(meth)acryloylthioethylthio]-3-(meth)acryloylthiopro pane, thioglycidyl thio(meth)acrylate, glycidyl thio(meth)acrylate, 1,2-bis[(meth)acryloylthio]benzene, 1,3-bis[(meth)acryloylthio]benzene, 1,4-bis[(meth)acryloylthio]benzene, 1,2-bis[(meth)acryloylthiomethyl]benzene, 1,3-bis[(meth)acryloylthiomethyl]benzene, 1,4-bis[(meth)acryloylthiomethyl]benzene, 1,2-bis[2-(meth)acryloylthioethylthiomethyl]benzene, 1,3-bis[2-(meth)acryloylthioethylthiomethyl]benzene, 1,4-bis[2-(meth)acryloylthioethylthiomethyl]benzene and the like; allyl compounds such as allylglycidyl ether, diallylphthalate, diallylterephthalate, diallylisophthalate, triallyl isocyanurate, diallyl carbonate, diethylene glycol bisallyl carbonate, diallyl sulfide, diallyl disulfide and the like; vinyl compounds such as styrene, chlorostyrene, methylstyrene, bromostyrene, dibromostyrene, divinylbenzene, 3,9-divinylspirobi(m-dioxane) and the like; diisopropenylbenzene and the like.

Considering the optical properties such as refractive index and the like, mechanical properties such as impact resistance and the like that are desired objects of the present invention, among the compounds, preferred are an isocyanate compound, a polyiso(thio)cyanate compound and a (thio)epoxy compound.

The compound having a functional group reacting with a thiol group may be used singly or a plurality of different compounds may be used together.

In the present invention, preferred embodiments are (A) a thiol compound having two or more thiol groups and an atom selected from metal atoms in a molecule or a polythiol composition containing the thiol compound as an essential component and (B) a polymerizable composition containing a polyisocyanate compound, or (A) a thiol compound having two or more thiol groups and an atom selected from metal atoms in a molecule or a polythiol composition containing the thiol compound as an essential component and (B) a polymerizable composition containing a polyene compound having two or more unsaturated carbon-carbon double bonds in a molecule.

In the polymerizable composition of the present invention, the proportion of each component comprising the composition is not particularly limited, but it is preferably as follows. That is, the content of the (A) component is not particularly limited, but it is usually not less than 10% by weight, preferably not less than 20% by weight, more preferably not less than 30% by weight and further preferably not less than 40% by weight, based on the total weight of the composition.

Furthermore, the content of the (B) component is not particularly limited, but it is usually not less than 10% by weight, preferably not less than 20% by weight, more preferably not less than 30% by weight and further preferably not less than 40% by weight, based on the total weight of the composition.

The polymerizable composition of the present invention may contain other polymerizable compounds in addition to the above (A) and (B) components in the ranges in which the desired effect of the present invention is not impaired.

Examples of the polymerizable compound include various polymerizable monomers or polymerizable oligomers, known in the art. Examples thereof include a compound having an unsaturated carbon-carbon double bond such as a (meth)acrylic acid ester compound and a vinyl compound, an epoxy compound, an episulfide compound, an oxetane compound, a thietane compound and the like.

More specifically, when the polymerizable composition of the present invention is (A) the thiol compound having two or more thiol groups and an atom selected from metal atoms in a molecule or a polythiol composition containing the thiol compound as an essential component, and (B) the polymerizable composition containing a polyisocyanate compound, examples of other compounds include a compound having an unsaturated carbon-carbon double bond such as a (meth)acrylic acid ester compound and a vinyl compound, an epoxy compound, an episulfide compound, an oxetane compound, a thietane compound and the like.

Furthermore, when the polymerizable composition of the present invention is (A) the thiol compound having two or more thiol groups and an atom selected from metal atoms in a molecule or a polythiol composition containing the thiol compound as an essential component, and (B) the polymerizable composition containing a polyene compound having two or more unsaturated carbon-carbon double bonds in a molecule, preferred examples of other polymerizable compositions include an epoxy compound, an episulfide compound, an oxetane compound, a thietane compound and the like.

The content of these other polymerizable compounds occupied in the total weight of the polymerizable compounds contained in the polymerizable composition of the present invention is not particularly limited, but it is usually not more than 90% by weight, preferably not more than 80% by weight, more preferably not more than 70% by weight, and further preferably not more than 50% by weight.

Various resin modifiers may be added to the polymerizable composition of the present invention for the purpose of adjusting general physical properties such as optical properties, impact resistance or specific gravity of the obtained resin, or adjusting the viscosity or handling of the polymerizable composition.

In the production of the polymerizable composition of the present invention, various substances may also be added in the ranges in which the effect of the present invention is not damaged as desired. Examples of the substance include a chain extension agent, a crosslinking agent, a light stabilizer, an ultraviolet absorbent, an anti-oxidant, an anti-coloring agent, a blueing agent, a dye, a flowability regulator, a filler, an internal release agent and the like.

When polymerizing the polymerizable composition of the present invention, a known reaction catalyst may also be used as needed for the purpose of adjusting the speed of the polymerization reaction. Examples of this reaction catalyst include, in the case of a (thio)urethanization reaction using a poly(thio)isocyanate compound, tin compounds such as dibutyltin dilaurate, dibutyltin dichloride, dimethyltin dichloride and the like; and amine compounds such as a tertiary amine and the like. In case of a polymerization reaction with a thio(epoxy) compound, examples thereof include an amine compound, a phosphine compound, a Lewis acid compound, a radical polymerization catalyst, a cationic polymerization catalyst and the like. In case of a polymerization reaction with an ene compound, examples thereof include a radical polymerization catalyst, a photosensitizer and the like.

The amount of such a polymerization catalyst used is not particularly limited since it is affected by compositions of the polymerizable composition, polymerization conditions and the like. However, it is from 0.0001 to 10 weight parts, preferably from 0.001 to 5 weight parts and more preferably from 0.005 to 3 weight parts, based on 100 weight parts of the total polymerizable compounds contained in the polymerizable composition.

Furthermore, a plurality of the aforementioned polymerization catalysts may also be used together.

A typical method for producing the polymerizable composition of the present invention comprises adding a polymerization catalyst and as needed various additives to a mixed solution adjusted by mixing the thiol compound or the polythiol composition of the present invention with a compound having a functional group reacting with a thiol group and further using various polymerizable compounds as needed, and then mixing and dissolving the resulting mixture. The polymerizable composition is preferably used after thoroughly degassing according to an appropriate method such as under a reduced pressure or the like. Furthermore, the polymerizable composition is preferably used for polymerization after filtering off insoluble substances, foreign substances or the like before polymerization.

The resin of the present invention and an optical component composed of the resin is obtained typically by subjecting the above polymerizable composition to a casting polymerization.

That is, the polymerizable composition of the present invention is injected into a mold and heated as needed for carrying out polymerization. The mold is usually composed of two pieces of glass plates supported by a tape or a gasket.

The polymerization conditions are not particularly limited since they are affected by the type of the polymerization monomer, the type or amount of the polymerization catalyst, the shape of the mold in use and the like. But, the polymerization temperature is usually from −20 to 200 degree centigrade, preferably from −20 to 170 degree centigrade, and more preferably from 0 to 150 degree centigrade. The polymerization time is affected by the polymerization temperature, but it is usually from 1 to 100 hours.

Furthermore, polymerization can also be carried out in combination of several temperatures by conducting temperature elevation, temperature dropping and the like as required.

Furthermore, the polymerizable composition of the present invention can also be polymerized by applying the active energy line such as an electron beam, ultraviolet light, visible light or the like. At this time, a radical polymerization catalyst or a cationic polymerization catalyst for initiating polymerization by the active energy line is used as required. As a light source used for photopolymerization, there are used a high-pressure mercury lamp, a halogen lamp, a xenon lamp, a tungsten lamp, a fluorescent lamp, a solar light and the like. The optical component of the lens obtained by the polymerization and the like may be subjected to an annealing process as needed.

After the obtained optical lens is cured, it can be subjected, for purposes of anti-reflection, high hardness grant, wear resistance improvement, chemical resistance grant, anti-fogging property grant or fashionability grant, to various known physical or chemical processes such as surface polishing, antistatic process, hard coat process, non-reflective coat process, dyeing process, photochromic process (for example, photochromic lens process and the like) and the like as needed.

Meanwhile, the resin cured product and optical component obtained by polymerization of the polymerizable composition of the present invention have high transparency, good heat resistance and mechanical strength, while attaining a high refractive index (nd) exceeding 1.7.

Examples of the optical component of the present invention include various plastic lenses such as a spectacle lens for vision correction, a lens for cameras, a fresnel lens for liquid crystal projectors, a lenticular lens, a contact lens and the like, a diffractive optical element, a sealing material for light emitting diodes (LED), an optical waveguide, an optical adhesive used for the junction of an optical lens or an optical waveguide, an anti-reflection film to be used for optical lenses, transparent coating used for liquid crystal display members (substrate, light guiding plate, film, sheet and the like) or transparent substrate and the like.

EXAMPLES

The present invention is now more specifically illustrated below with reference to Preparation Examples and Examples. However, the present invention is not limited to these Examples.

Incidentally, SH value (meq/g) was obtained in the following manner.

<Measurement Method of SH Value (meq/g)>

About 0.2 g of a sample was exactly weighed to give a homogeneous solution by adding 50 ml of a mixed solvent of methanol and chloroform at a ratio of 50/50 (volume/volume). The total amount of this solution was titrated with a 0.1N iodine solution, and the end-point was determined when the color of the solution turned into light yellow. The SH value was calculated from the following formula.

$$\text{SH Value(meq/g)} = \{(A-B) \times f \times 0.1\}/S$$

A: titration amount (mL) of 0.1N iodine solution required for the titration of the sample
B: titration amount (mL) of 0.1N iodine solution required for the titration of the blank test
f: factor of 0.1N iodine solution
S: amount of the sample collected (g)

Example 1

Preparation of a Polythiol Composition Containing a Compound Represented by the Formula (1-2) of the Present Invention To a 2-liter reaction vessel equipped with a stirrer, a thermometer and a dropping funnel 125.2 g (0.48 mol) of the polythiol compound represented by the formula (2) and 600 g of pure water were added. 320 g (0.80 mole) of 10% NaOH aqueous solution was dropped at 25 degree centigrade over 1 hour under stirring. Subsequently, the reaction solution was heated to 40 degree centigrade and 520.8 g (0.20 mole) of a 10% tin tetrachloride aqueous solution was dropped over 4 hours. After the dropping, the solution was further stirred at the same temperature for 4 hours and then cooled down to room temperature. 1000 ml of chloroform was fed into the reaction mixture, and the organic layer and the water layer were separated. The organic layer was further washed with 800 ml of pure water twice. The obtained organic layer was dried over 80 g of anhydrous sodium sulfate and then the solvent was distilled off to obtain 149.2 g of a composition containing the formula (1-2).

SH value: 4.90 meq/g

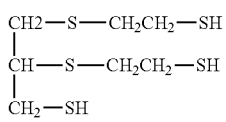

(2-1)

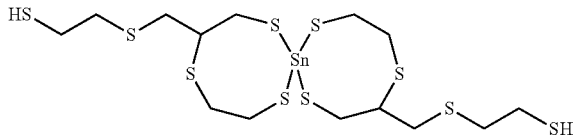

(1-2)

Example 2

Preparation of a Compound Represented by the Formula (1-2) of the Present Invention 80 g of the composition obtained in Example 1 was used and was purified by silica gel column chromatography with a development solvent of toluene to obtain 60.0 g of a compound represented by the formula (1-2).

<Preparation of the Polymerizable Composition of the Present Invention and Preparation of a Resin Cured Product by Polymerization thereof>

The physical properties of the resins or optical parts (lenses) prepared in Examples were evaluated in the following manner.

Appearance: Color, transparency, and optical distortion were confirmed visually or using a microscope.

Refractive index: It was measured at 20 degree centigrade using a Pulfrich refractometer.

Example 3

At room temperature (25 degree centigrade), 24.0 g of the polythiol composition containing the compound represented by the formula (1-2) prepared in Example 1 and 11.0 g of m-xylylene diisocyanate were weighed in a glass beaker, and 0.035 g of dibutyltin dilaurate as a polymerization catalyst and 0.035 g of Zelec UN (a product oby Dupont Company) as an internal release agent were added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.702.

Example 4

At room temperature (25 degree centigrade), 27.0 g of the compound represented by the formula (1-2) prepared in Example 2 and 8.0 g of m-xylylene diisocyanate were weighed in a glass beaker, and 0.035 g of dibutyltin dilaurate as a polymerization catalyst and 0.035 g of Zelec UN (a product by Dupont Company) as an internal release agent were added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.724.

Example 5

At room temperature (25 degree centigrade), 24.9 g of the polythiol composition containing the compound represented by the formula (1-2) prepared in Example 1 and 10.1 g of triallyl isocyanurate represented by the formula (2-2) were weighed in a glass beaker, and as a polymerization catalyst, 0.035 g of t-butylperoxy-2-ethyl hexanoate (Product name: Perbutyl O, a product by Nippon Oils and Fats Co., Ltd.) was added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.701.

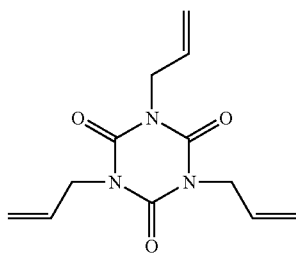

(2-2)

Example 6

At room temperature (25 degree centigrade), 27.7 g of the compound represented by the formula (1-2) prepared in Example 2 and 7.3 g of triallyl isocyanurate represented by the formula (2-2) were weighed in a glass beaker, and as a polymerization catalyst, 0.035 g of t-butylperoxy-2-ethyl hexanoate (Product name: Perbutyl O, a product by Nippon Oils and Fats Co., Ltd.) was added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.717.

Comparative Example 1

At room temperature (25 degree centigrade), 16.8 g of the compound represented by the formula (2-1) and 18.2 g of m-xylylene diisocyanate were weighed in a glass beaker, and 0.035 g of dibutyltin dilaurate as a polymerization catalyst and 0.035 g of Zelec UN (a product by Dupont Company) as an internal release agent were added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.660.

Comparative Example 2

At room temperature (25 degree centigrade), 17.9 g of the compound represented by the formula (2-1) and 17.1 g of triallyl isocyanurate represented by the formula (2-2) were weighed in a glass beaker, and as a polymerization catalyst, 0.035 g of t-butylperoxy-2-ethyl hexanoate (Product name: Perbutyl O, a product by Nippon Oils and Fats Co., Ltd.) was added thereto, and then the resulting mixture was stirred for fully mixing. The obtained mixed solution was filtered off using a Teflon (registered trademark) filter, and then thoroughly degassed under a reduced pressure of not more than 1.3 kPa until no bubble was observed. The polymerizable composition was injected into a mold composed of a glass mold and a tape. Then, the resultant was put into a heating oven, subjected to a temperature elevation from 30 to 120 degree centigrade slowly, and polymerized for 20 hours.

A molding sample piece of the obtained resin was excellent in transparency and had good appearance with no distortion.

The refractive index (nd) of the obtained resin was measured. As a result, it was 1.626.

The resin obtained by polymerization of the polymerizable compound of the present invention has high transparency, good heat resistance and mechanical strength, while attaining a high refractive index (nd) exceeding 1.7. So, the resin is useful as a resin for use in optical components such as plastic lenses and the like.

The invention claimed is:

1. A compound represented by the general formula (1), $$(Y_q)_{n-m}-M[-X_p-R_p-SH]_m \qquad (1)$$

wherein, in the formula, M represents an Sn atom, an Si atom, a Zr atom, a Ti atom or a Ge atom; Rp each independently represents a divalent organic group; Xp each independently represents a sulfur atom or an oxygen atom; Yq each independently represents a monovalent inorganic or organic group; m represents an integer of 2 to n; n represents a valency of a metal atom M; and when m is not less than 2, -(-Xp-Rp-SH) may be bonded to one another for forming a group of a ring structure.

2. The compound as set forth in claim 1, wherein when m is not less than 2, -(-Xp-Rp-SH) is bonded to one another for forming a group of a ring structure.

3. The compound as set forth in claim 1, wherein at least one of Rp contains a S atom.

4. A polythiol composition comprising the compound as set forth in claim 1.

5. A polymerizable composition comprising the compound as set forth in claim 1.

6. A polymerizable composition comprising the polythiol composition as set forth in claim 4.

7. A resin obtained by polymerization of the polymerizable composition as set forth in claim 5.

8. A resin obtained by reacting and curing the compound as set forth in claim 1 with a polyisocyanate compound.

9. A resin obtained by reacting and curing the polythiol composition as set forth in claim 4 with a polyisocyanate compound.

* * * * *